May 23, 1961 R. I. LAW ET AL 2,984,850
LEAF CURTAIN ATTACHMENT FOR LAWN SWEEPERS
Filed July 11, 1958 3 Sheets-Sheet 1

INVENTORS
RAYMOND I. LAW
& IRENE L. LAW
BY
McMorrow, Berman & Davidson
ATTORNEYS

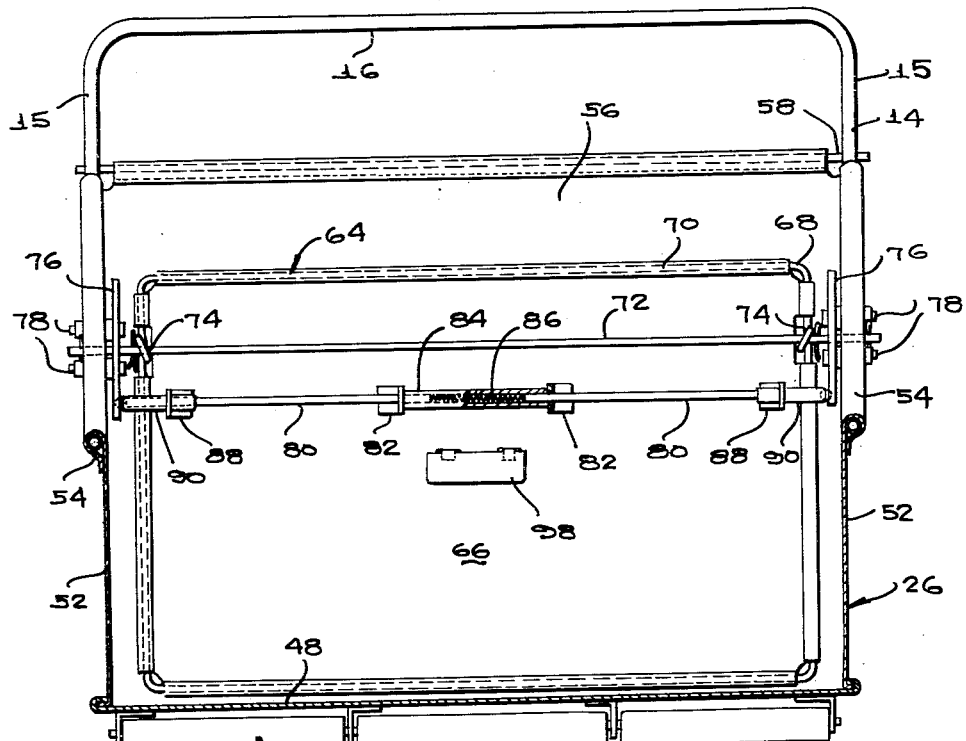
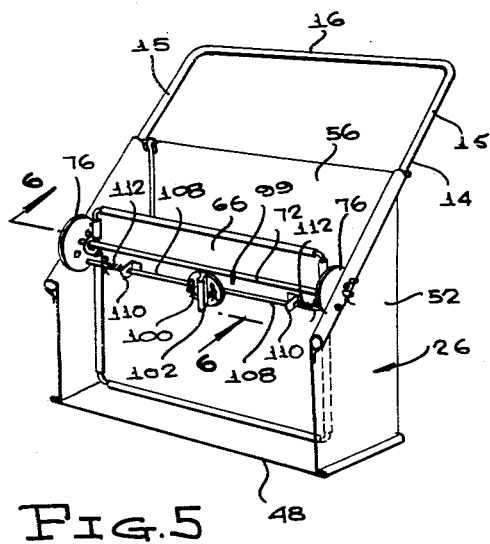
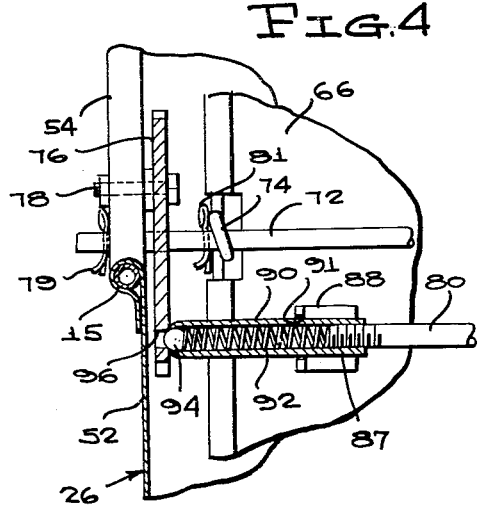

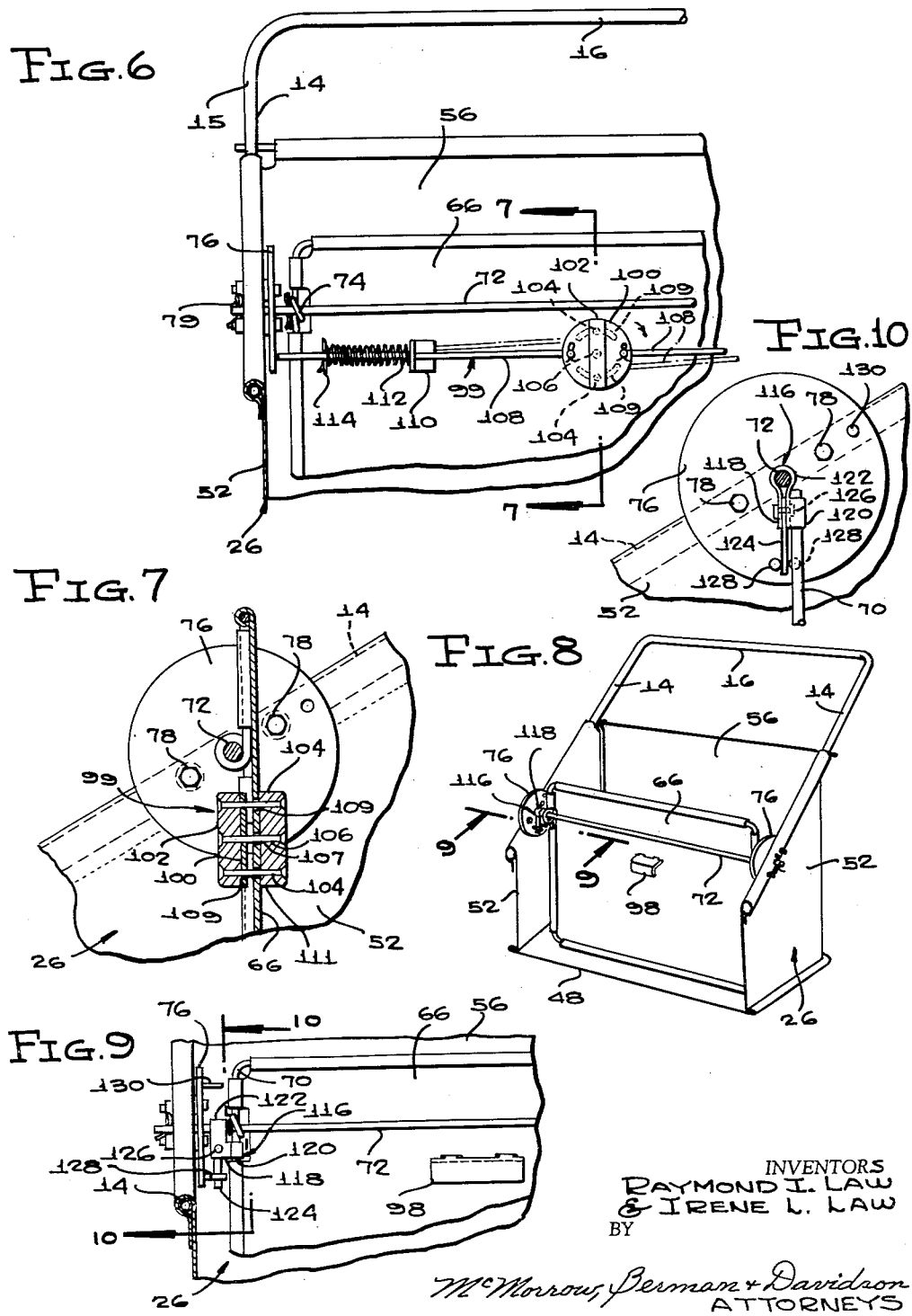

United States Patent Office 2,984,850
Patented May 23, 1961

2,984,850

LEAF CURTAIN ATTACHMENT FOR LAWN SWEEPERS

Raymond I. Law and Irene L. Law, both of 1561 6th St., Muskegon, Mich.

Filed July 11, 1958, Ser. No. 747,954

1 Claim. (Cl. 15—79)

This invention relates generally to the construction of lawn sweepers, of the type used for sweeping up leaves and similar debris accumulated on the lawn. More particularly, the invention has reference to a leaf curtain attachment, designed to be mounted within the debris receptacle of a sweeper of this type.

A sweeper of the general type referred to above is provided with a trash receptacle or catching basket disposed rearwardly of the brush assembly of the device, in position to receive leaves and other trash that are swept up by the device. The receptacle opens both upwardly and in a forward direction, and as will be understood, must be emptied from time to time, when trash accumulates therein to an extent that affects adversely the adaptability of the device for depositing further debris or lawn trash in the receptacle.

In operation of a typical sweeper of the kind referred to above, we have found that the receptacle or trash basket tends, after becoming about one-third full, to affect in an adverse manner the efficiency of the device for depositing additional leaves in the basket. It has been found that in the circumstances indicated, leaves begin to move in reverse through the rotary brush incorporated in the sweeper. In other words, the accumulation in the basket, even when the basket is about one-third full, is so disposed therein as to represent an obstruction to the movement of additional trash from the brush into the basket. Said additional trash, instead of moving freely into the basket, begins to, in effect, clog or obstruct the path of movement of the leaves from the brush to the basket, and leaves begin to fall back through the brush assembly.

In such event, the user follows the practice of attempting to brush the leaves back within the basket, away from the rotary brush assembly, with his hand. However, even in these circumstances the accumulation prevents fully efficient operation of the device, and the basket must be emptied. This is undesirable, in that even though the basket is only approximately one-third full, it must be fully emptied, thereby representing an inconvenience and a loss of time which it is desired to avoid by means of the present invention.

In accordance with the present invention, it is proposed to provide a leaf curtain attachment, for mounting within the basket, so designed as to enable the user to effect the accumulation of debris within the receptacle to an extent such as to almost or entirely fill the receptacle, without interference with proper operation of the sweeping brush.

It is further proposed to provide a leaf curtain attachment as stated which can be incorporated in lawn sweepers already in use, without requiring modification or redesign of said sweepers except, perhaps, to a completely inconsequential degree.

Still another object of importance is to provide a lawn sweeper attachment of the character stated which will not in any way reduce the capacity of the trash receptacle.

Yet another object is to so form the leaf curtain attachment as to permit it to be adjusted between operative and inoperative positions swiftly and easily.

A further object is to provide a leaf curtain attachment of the character described that will be capable of manufacture at a very low cost, considering the benefits to be obtained from the use thereof.

Still another object is to incorporate in the leaf curtain attachment a detent means, designed to automatically, releasably lock the device in its operative position.

Other objects will appear from the following description, the claims appended thereto, and from the annexed drawings, in which like reference characters designate like parts throughout the several views, and wherein:

Figure 3 is a transverse sectional view on the same scale as Figure 2, taken on line 3—3 of Figure 2;

Figure 4 is a still further enlarged, detail sectional view on line 4—4 of Figure 2;

Figure 5 is a fragmentary perspective view of the lawn sweeper equipped with a modified form of the attachment, on the same scale as Figure 1;

Figure 6 is an enlarged, detail sectional view on line 6—6 of Figure 5;

Figure 7 is an enlarged, transverse sectional view on the same scale as Figure 6, taken on line 7—7 of Figure 6;

Figure 8 is a view like Figure 5 showing another modification;

Figure 9 is an enlarged, detail sectional view on line 9—9 of Figure 8; and

Figure 10 is a sectional view, on a scale increased above that of Figure 9, taken on line 10—10 of Figure 9.

Figures 1, 2:
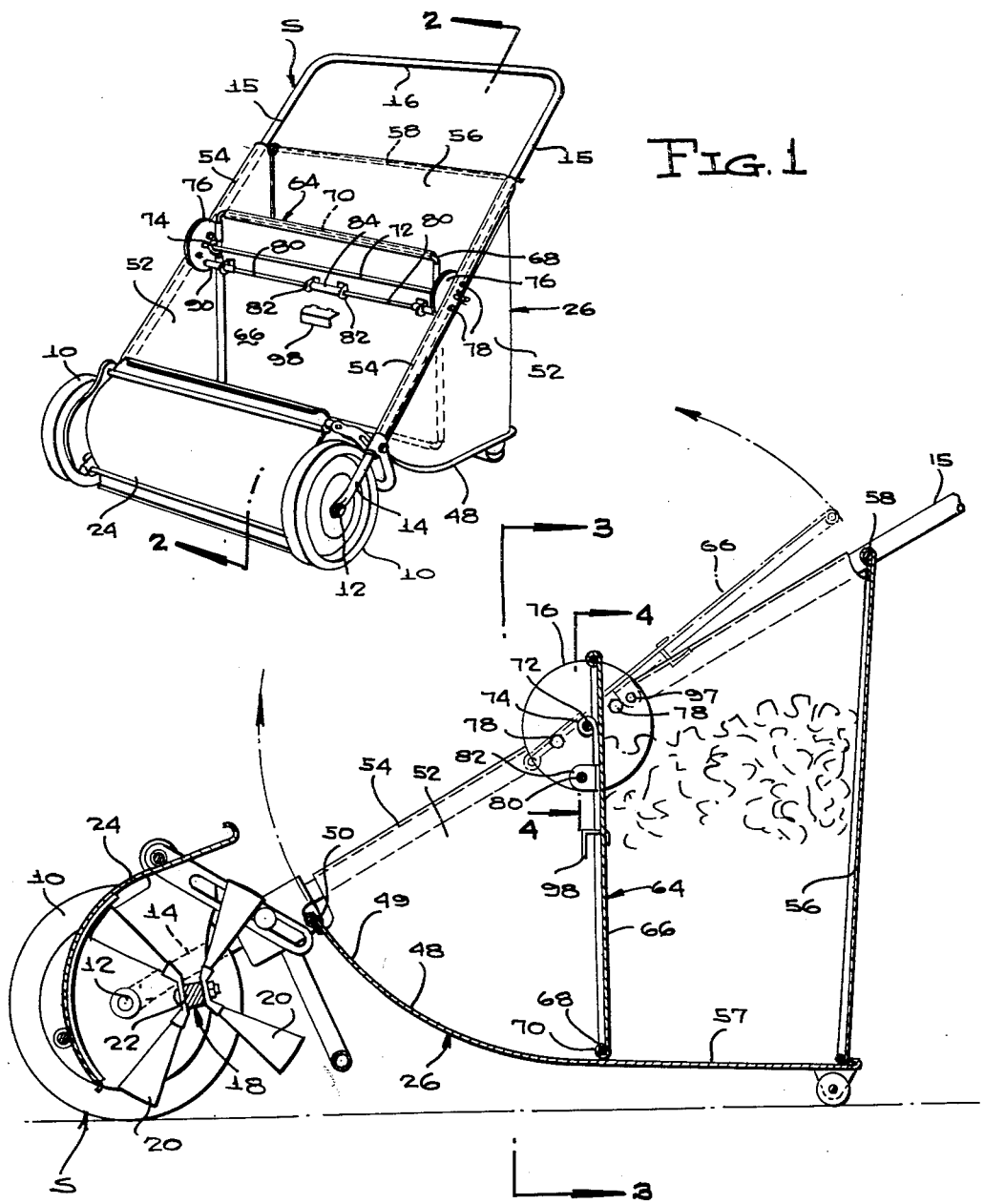
Figure 1 is a perspective view of a lawn sweeper equipped with a leaf curtain attachment according to the present invention.
Figure 2 is a longitudinal sectional view through the sweeper and through the attachment, taken substantially on line 2—2 of Figure 1, on an enlarged scale, the attachment being shown in operative and inoperative positions in full and dotted lines respectively.

Referring to the drawing in detail, in the several figures of the drawing, there is shown a conventional lawn sweeper generally designated S. This includes the usual transversely spaced ground wheels 10, connected by axle 12. A handle 14 includes transversely spaced, parallel side rails 15 connected at their rear ends by a bight portion 16 providing a hand grip.

The illustrated sweeper is a conventional sweeper, capable of being purchased on the open market and manufactured by the Parker Sweeper Company, Springfield, Ohio, under the trademark "Kleen Sweep."

Since the sweeper S is known in and of itself, it need not be described in detail, except to show the basic construction and operation thereof. Thus, the sweeper has a rotary brush assembly generally designated 18, provided with a plurality of radially outwardly projecting brushes 20 that are secured to a wheel shaft 22, said shaft being driven in a clockwise direction viewing the same as in Figure 2. The sweeper further includes an upwardly rearwardly curving hood or deflector plate 24, disposed in front of the brush assembly, and so arranged that when the brush assembly is driven, the leaves swept by the brushes will travel along the rear or inner surface of the plate 24, being discharged rearwardly above the brush assembly into a leaf basket or debris receptacle generally designated 26 in the several figures of the drawing.

Basket 26 is suspended from the respective side rails 15 of handle 14, and includes a bottom wall 48, formed of sheet metal material and having a forwardly upwardly curving front portion 49 connected to a transverse front suspension bar 50 that extends between the side rails 15 immediately in back of brush assembly 18.

The debris receptacle also includes side walls 52 which are of canvas or other collapsible, flexible material, these having hems 54 along their forwardly declining top edges receiving rails 15. A back wall 56 also of canvas material is connected at its lower end to the back edge of the substantially flat rear portion 57 of bottom wall 48. Back wall 56 at its top edge is hemmed to receive a transverse rear suspension bar 58 connected between side rails 15.

It is thus seen that the conventional sweeper S includes a debris receptacle which opens upwardly and also forwardly, said receptacle being progressively decreased in depth in a direction from its back to its front end.

The attachment comprising the present invention has been generally designated 64 in Figures 1–3, and is adapted to be mounted upon the side rails 15 in position extending therebetween, within the trash receptacle 26. The leaf curtain attachment essentially is a flat member, pivotally mounted within the debris receptacle for swinging movement between the vertical, operative position shown in full lines in Figure 2 and the inoperative, inclined position shown in dotted lines in the same figure of the drawing.

The leaf curtain includes a generally rectangular panel 66, formed of sheet metal in a typical embodiment, although of course, other suitable materials might be employed. In any event, the panel 66 in width extends across almost the full width of the trash receptacle, and in height, the panel when in operative position extends from a location close to bottom wall 48 to a location spaced upwardly a short distance from side rails 15.

Panel 66 has rolled edges 68, receiving a peripherally extending, wire reinforcing frame 70.

Designated at 72 is a transversely extending shaft, the end portions of which extend loosely through loops 74 each of which is a single convolution of the wire material of reinforcing frame 70, said convolutions being disposed at the opposite sides of the frame as shown to particular advantage in Figure 3, near the top portion of said frame.

Thus, the panel is rotatably or pivotally mounted upon the shaft 72 for swinging movement about a horizontal, transverse axis disposed adjacent the upper edge of the panel. The term "upper edge" is, of course, used in the sense of the edge which is disposed upwardly in the operative condition of the panel shown in full lines in Figure 2. It will be seen in Figure 2 that the panel 66 swings on said axis through substantially 250 degrees of a circle.

Designated at 76 are circular support plates disposed in vertical planes in close proximity to the inner surfaces of side rails 15. Each plate is fixedly secured to its associated side rail by diametrically opposed bolts 78 (Figure 2). Shaft 72 at its ends extends through center openings of plates 76, registered with openings formed in the side rails 15, and cotter pins 79 are employed for holding shaft 72 against endwise movement (see Figure 4).

Other cotter pins 81 (see Figure 4) are extended through shaft 72, engaging the outer surfaces of loops 74 to hold the panel 66 against movement longitudinally of the shaft from its proper, centered position shown in Figure 3. Of course, the panel is still freely rotatable upon the shaft 72 in the manner previously described herein.

The invention includes detent means, for releasably retaining the panel in both its operative and inoperative positions. To this end, secured fixedly to and projecting forwardly from the panel 66 (see Figures 2 and 3), are angle brackets 82, disposed equidistantly from the vertical center line of panel 66. Extending between the brackets 82 is a sleeve 84, in which is a compression, coil spring 86 abutting against its opposite ends against coaxially aligned plungers or detent stems 80 axially slidable in openings formed in the forwardly projecting portions of the brackets 82.

Referring to Figure 4, the stems 80 at their outer ends are threaded as at 87, to engage complementary internal threads formed in a tubular extension 90 of each stem 80, the extensions 90 being axially slidable in openings 91 formed in angle brackets 88 fixedly secured to the panel 66 adjacent the respective side edges of the panel. Compression, coil springs 92 are disposed within the extensions 90, abutting at one end against the associated stems 80 and at their other ends against ball detent elements 94 to bias said elements into openings 96 of plates 76.

Thus, when the panel is in its operative position shown in full lines in Figure 2, the ball detent elements will engage in openings 96 to releasably retain the panel in said operative position. However, the user need only exert a positive force upon the panel, to cause the same to rock about its axis defined by shaft 72. Said positive force will cause the element 94 to move out of the opening 96, with the ball detent element now sliding along the surface of the plate 76. Then, when the panel reaches its inoperative position in which it inclines upwardly, rearwardly from its pivot axis as in dotted lines in Figure 2, the ball detent element 94 will move into openings 97 disposed in the rear portion of plates 76, as clearly seen in Figure 2. Once again, the panel will be releasably engaged in its assigned position.

A handle 98 can be provided, this being secured to the panel below the brackets 82, and being of right-angular cross section, to facilitate grasping of the panel when the same is being swung between its operative and inoperative positions.

In Figure 5 there is shown a modified detent means generally designated 99. The detailed construction of detent means 99 is shown in Figures 6 and 7.

In this form, there is provided a rotary detent operating plate 100, disposed midway between opposite sides of the panel 66 in close proximity to the front surface of the panel. A diametrically extending handle block 102 is fixedly secured to plate 100. Projecting rearwardly from the end portions of the handle block 102 are guide pins 104, and projecting rearwardly from the centers of the block 102 and plate 100 is a center pin 106.

Pin 106 extends through a small, circular opening 107 of panel 66, while pins 104 extend through arcuate, diametrically opposed guide slots 109 formed in panel 66 (Figures 6 and 7). Pins 104, 106 are connected between handle 102 and a similar handle 111 disposed against the opposite face of panel 66.

Pins 104, of course, project through small circular openings of plate 100, so that on rotation of either the handle 102 or of the handle 111 about the axis of pin 106, the plate 100 will be rotatably moved with the selected handle. The reason for two handles is to have, at all times, a handle disposed in convenient position to be grasped, both in the operative and inoperative positions of the panel 66.

Referring to Figure 6, pivotally connected at said inner ends to diametrically opposite portions of plate 100 are detent rods 108, longitudinally slidable and slightly rockable, intermediate their ends, in forwardly projecting angle brackets 110 having openings through which the rods 108 are loosely positioned. Brackets 110 are fixedly secured to and project forwardly from panel 66, and abutting at one end against the brackets 110 are compression, coil springs 112.

Springs 112 are held under compression between brackets 110 and cotter pins 114 extending through rods 108 outwardly from the brackets 110. The distal ends of the rods 108 are disposed for engagement in the openings 96, 97 of plates 76, according to whether the panel 66 is to be operatively or inoperatively disposed.

It will be apparent that normally, the springs 112, tending to expand, will bias the rods 108 outwardly from the plate 100, to engage the rods in the openings 96 or 97, as the case may be. Thus, the panel 66 is releasably locked in each of its opposite extreme positions. When, however, the panel is to be released for swinging movement to its other position, one merely grasps handle 102 or 111, depending upon which is most conveniently disposed, and partially rotates plate 100 in either direction. This draws the rods 108 inwardly from the plate 76, to disengage the rods from the openings in which they were engaged. The panel 66 is moved to a slight extent from its previous position, and the detent means is then released. The rods 108 will, of course, be biased outwardly immediately, but will now be offset from the openings 96 or 97, and will slide at their distal ends along the faces of the plate 76 as the panel 66 continues its movement to its other extreme position. On arrival at its other extreme position, the panel 66 will be automatically locked by rods 108 moving into the openings 96 or 97, as the case may be.

In Figures 8–10, there is shown yet another detent assembly, generally designated 116. In this form of the detent assembly, there are provided, at opposite sides of the panel 66, L-shaped spring support brackets 118. Each bracket 118 may be formed from a single length of flat sheet metal stock, one end being bent in the form of a sleeve 120 that extends about the adjacent side of the reinforcing frame 70 (Figure 10). Alternatively, instead of forming a sleeve 120 the bracket could simply be provided with a lateral projection engaging against the frame 70 and secured thereto by screws, rivets, or equivalent fastening means.

Intermediate its ends, the bracket material is bent about the shaft 72 to form a sleeve 122 (Figure 10).

At the juncture of the angularly related legs of the bracket, a flat leaf spring 124 is clamped between the folded portions of the bracket, and is fixedly secured in position by a rivet 126.

Spring 124 projects from the bracket radially of the shaft 72, and in the operative position of the panel 66 extends at its distal end between closely spaced, laterally projecting stop lugs 128 secured to the adjacent plate 76. Angularly spaced about the margin of the plate 76 from the lugs 128 is another stop lug 130, engaging the spring in the inoperative position of the panel 66.

Only a single lug 130 is needed because when the panel is swung to its inoperative position, it may rest at its back edge against the top bar 58 of the trash receptacle's back wall.

The leaf spring is, of course, sufficiently flexible to permit the same to move into and out of the space between the lugs 128.

In all forms of the invention, of course, the detent means releasably engages the panel in the selected extreme position of the panel. However, regardless of the detent means used, the manner of use of the panel, and the positions to which it is movable, remain the same.

In use, and assuming that the panel is positioned in its upper position, the lawn sweeper is operated in the usual manner. Leaves and other lawn trash will accumulate in the receptacle.

The user, with panel 66 initially disposed in its inoperative or upper position shown in dotted lines in Figure 2, operates the lawn sweeper in the regular manner until a fairly substantial quantity of leaves has accumulated within the receptacle, and the leaves begin to roll in a reverse direction through the brush assembly. In other words, with the panel in its upper position, the user first operates the lawn sweeper to the extent that heretofore has begun to produce the undesirable return movement of the leaves through the brush assembly noted previously herein. The receptacle, at this time, as also previously noted herein, would be approximately one-third full.

At this time, the user brushes the leaves rearwardly to some extent with his hand within the receptacle, and then swings panel 66 from the dotted line to the full line position shown in Figure 2, in a counterclockwise direction in this figure. It will be noted that the end of the panel remote from the pivot axis traverses an arcuate path parallel to and closely spaced from the curved forward end portion 49 of the bottom wall 57 of the trash receptacle at this time.

The panel 66, moving to its operative position shown in Figure 2, will be effective to move all leaves now in the basket rearwardly into the space between panel 66 and back wall 56, which space constitutes a retaining or storage area for the leaves or other trash.

Then, the lawn sweeper is further operated until additional leaves have accumulated in front of the vertically positioned panel 66, that is, in the receiving area defined between the panel and the front of the receptacle. Periodically, the user picks up a few handsful of the leaves in front of the panel 66 and places them in the rear half of the basket, that is, in back of the vertically positioned panel 66. This operation is repeated from time to time until the space in the back of the panel 66 is filled fully to the top. It will be noted that the upwardly projecting portion of the panel 66, in the operative position of the panel, increases the capacity of the rear half of the basket to enable the rear half of the basket to be filled to almost the full height of the canvas back wall 56.

The sweeper can be operated still further, to accumulate additional leaves in front of the panel 66, after which the basket can be readily emptied in the usual manner. It has been found, in this connection, that there is ample space left within the top of the receptacle, through which the trash may move when the receptacle is being emptied, even when the leaf curtain is in its upper, dotted line position of Figure 2.

It will be apparent that the device can be attached with maximum ease and speed to the conventional lawn sweeper, and in some forms of the invention, not shown herein, it might be possible to employ clamp devices for connecting the plates 76 to the sides of the handle 14, so that the plates 76 are fixedly secured to said sides of the handle without necessity of drilling the side rails of the handle to receive the bolts 78. Such an arrangement would completely eliminate drilling operations on lawn sweepers that are already in use. Of course, lawn sweepers that are being manufactured can be drilled during the course of manufacture to receive the bolts 78, in the event one desires to use a lawn sweeper attachment of the character described.

Further, although the attachment is designed to operate with particular efficiency on the illustrated make and type of lawn sweeper, it could be used to advantage, it is believed, on various other kinds and sizes of lawn sweepers, without departure from the spirit of the invention.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

The combination, with mobile apparatus including lawn trash pick-up means, a handle extending rearwardly therefrom, and a receptacle suspended from the handle into which lawn trash is swept, of a retaining curtain for trash accumulating in the receptacle transversely of the same; a shaft connected between opposite sides of the receptacle, said panel being pivoted on the shaft to swing between a generally vertically operative position in which it extends as a partition across the receptacle, and an inoperative position in which it is disposed substantially wholly exteriorly of the receptacle with at least a major part of its area being located rearwardly of said operative position; and means for releasably locking the panel against movement at least in the operative position thereof, comprising spring support brackets connected to the panel at opposite sides thereof, leaf springs carried by said brackets and extending radially outwardly from the pivot axis of the panel, and locking plates fixedly mountable upon the respective sides of the receptacle and including laterally projecting stop lugs engageable with said leaf springs at least in the operative position of the panel.

References Cited in the file of this patent

UNITED STATES PATENTS

| | | |
|---|---|---|
| 1,144,292 | Brown | June 22, 1915 |
| 2,517,335 | Muzzy | Aug. 1, 1950 |
| 2,737,673 | Parker | Mar. 13, 1956 |
| 2,826,318 | Beasley | Mar. 11, 1958 |

FOREIGN PATENTS

| | | |
|---|---|---|
| 500,675 | Great Britain | Feb. 14, 1939 |